US012779930B2

(12) United States Patent
Liebold

(10) Patent No.: US 12,779,930 B2
(45) Date of Patent: Nov. 3, 2026

(54) DAMPING SYSTEM FOR MOTOR VEHICLE

(71) Applicant: Dr. Ing. h.c. F. Porsche Aktiengesellschaft, Stuttgart (DE)

(72) Inventor: Jochen Liebold, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 341 days.

(21) Appl. No.: 18/581,480

(22) Filed: Feb. 20, 2024

(65) Prior Publication Data

US 2024/0317011 A1 Sep. 26, 2024

(30) Foreign Application Priority Data

Mar. 21, 2023 (DE) ..................... 10 2023 107 020.7

(51) Int. Cl.
*B60G 17/06* (2006.01)

(52) U.S. Cl.
CPC ........ *B60G 17/06* (2013.01); *B60G 2202/416* (2013.01); *B60G 2500/114* (2013.01)

(58) Field of Classification Search
CPC .............. B60G 17/06; B60G 2202/416; B60G 2500/114; B60G 17/08; B60G 2400/202; B60G 2400/518; B60G 2600/182; F16F 9/19; F16F 9/46; F16F 9/466
See application file for complete search history.

(56) References Cited

U.S. PATENT DOCUMENTS 11,448,283 B2 9/2022 Strickland
12,330,468 B2 * 6/2025 Liebold .............. B60G 17/0165
2010/0163356 A1 7/2010 Hennecke et al.
2011/0079475 A1 4/2011 Roessle et al.
2015/0276004 A1 10/2015 Murakami et al.
2016/0091044 A1 3/2016 Murakami et al.
(Continued)

FOREIGN PATENT DOCUMENTS

DE 102010008723 A1 12/2010
DE 112010003954 T5 10/2012
(Continued)

OTHER PUBLICATIONS

German Patent No. DE 3931857 to Mettner published on Apr. 4, 1991.*

(Continued)

*Primary Examiner* — Pamela Rodriguez
(74) *Attorney, Agent, or Firm* — Buchanan Ingersoll & Rooney PC

(57) ABSTRACT

A damping system with an actively controllable shock absorber having a first working space and a second working space, which are separated from one another by a piston. A hydraulic pump conveys a hydraulic medium into the first working space or into the second working space. In order to dampen fast compression or rebound movements, the first working space is communicatively connected to a hydraulic reservoir via a first controllable throttle check valve, the second working space is communicatively connected to the hydraulic reservoir via a second controllable throttle check valve, and a two-way straight-through and controllable throttling device, which connects the first working space to the second working space in the open state, is arranged in the piston.

16 Claims, 2 Drawing Sheets

(56) References Cited

U.S. PATENT DOCUMENTS

| | | | |
|---|---|---|---|
| 2016/0263960 | A1 | 9/2016 | Teraoka et al. |
| 2018/0281550 | A1 | 10/2018 | Masamura |

FOREIGN PATENT DOCUMENTS

| | | | |
|---|---|---|---|
| DE | 102015211556 | B4 | 12/2016 |
| EP | 3015736 | A1 | 5/2016 |
| EP | 2165089 | B1 | 7/2018 |
| EP | 3357722 | A1 | 8/2018 |
| EP | 2937596 | B1 | 3/2020 |

OTHER PUBLICATIONS

German Patent No. DE 102005048949 to Foerster et al published on Dec. 14, 2006.*
German Patent No. DE 102010019289 to Mosler et al published on Nov. 10, 2011.*
German Patent No. DE 102010054908 to Kieserling et al published on Jun. 21, 2012.*
German Patent No. DE 102015200444 to Forster published on Jul. 14, 2016.*
German Patent No. DE 102017117658 to Liebold published on Feb. 7, 2019.*
German Patent No. DE 102019107218 to Witte et al published on Sep. 24, 2020.*

* cited by examiner

DAMPING SYSTEM FOR MOTOR VEHICLE

CROSS-REFERENCE TO RELATED APPLICATION

This application claims priority to German Patent Application No. 10 2023 107 020.7, filed Mar. 21, 2023, the content of such application being incorporated by reference herein in its entirety.

FIELD OF THE INVENTION

The present invention relates to a damping system with an actively controllable shock absorber having a first working space and a second working space, which are separated from one another by a piston. The invention also relates to a motor vehicle having such a damping system.

BACKGROUND OF THE INVENTION

EP 3 357 722 A1, which is incorporated by reference herein, discloses a passive 2-valve damper, in which a differential pressure between a pressure line and a suction line is controlled by means of a differential pressure valve.

U.S. Pat. No. 11,448,283 B2, which is incorporated by reference herein, discloses a further passive 2-valve damper, this time with a boost valve, by means of which a damping is adjustable. The boost valve is arranged separately from the piston of the damper.

EP 2 937 596 B1, which is incorporated by reference herein, discloses a damper, in which a damping force variation is enabled by means of a damping controller. The damping controller is in this case arranged within a piston.

EP 2 165 089 B1, which is incorporated by reference herein, discloses a damper having a damper cylinder, in which a piston ram is guided via a piston rod, wherein, for adjusting damper characteristics, the flow of a damper fluid is controllable via control means arranged within the damper cylinder, and wherein the control means control the flow of the damper fluid in a first flow direction with first adjustment means and in a second flow direction with second adjustment means. The first and second adjustment means are respectively designed as at least one spring element, wherein, for specifying a damping behavior, the spring rate of at least one of the spring elements is adjustable via corresponding specification means. By maintaining the proven leaf spring principle of a passive damper, a specification of the damping behavior is to be achieved through the adjustability of the spring rate of a spring-loaded throttle opening of the piston ram.

DE 11 2010 003 954 T5, which is incorporated by reference herein, discloses a damper having a digital valve, wherein a damping force variation is adjustable by means of a damping controller. The damper comprises a plurality of digital valves. The damping controller comprises a passive valve, which is arranged within a piston, and an active digital valve, which is arranged within a piston rod.

EP 3 015 736 B1, which is incorporated by reference herein, discloses a shock absorber, in which a piston is arranged within a cylinder and a controllable 2-way valve is arranged in the piston. In addition, an inlet check valve and an outlet check valve for the outflow of a working fluid are provided on the piston.

U.S. Pat. No. 2,016,263 960 A1, which is incorporated by reference herein, discloses a shock absorber with an adjustable valve in the piston so that a working fluid can controllably flow through the piston.

DE 10 2015 211 556 B4, which is incorporated by reference herein, discloses a damper valve device, wherein a controllable throttle valve and a damper valve having two passage direction openings (suction and pressure) are provided. The throttle valve is in this case arranged on the cylinder.

SUMMARY OF THE INVENTION

It is disadvantageous in the damping systems known from the prior art that, with them, a damping force variation at low damper speeds is not possible or only possible to an extremely limited extent.

The present invention therefore relates to the problem of specifying an improved or at least an alternative embodiment for a damping system of the generic type, which embodiment in particular overcomes the disadvantages known from the prior art.

The present invention relates to the general idea of increasing or decreasing a damping force variation at low damper speeds in that, in an active shock absorber with two throttle check valves, an additional two-way straight-through and controllable throttling device is arranged in a piston of the actively controllable shock absorber. As a result, in particular at low damper speeds, i.e., with a slow retraction and extension, the damper force can be adjusted or influenced without any problems. This controls the force gradient in the force build-up and force reduction, which can significantly improve the target conflict of driving comfort and driving dynamics. The mechanically predetermined and thus non-adjustable force gradient of the shock absorber very often does not correspond to the one that is required for the required build-up or the wheel damping. If the latter is too large, overdamping results; if it is too small, underdamping results. The damping system according to aspects of the invention has the aforementioned actively controllable shock absorber having a first working space and a second working space, which are separated from one another by the piston, and wherein the piston rod of the piston extends through the second working space. Also provided is a hydraulic pump for conveying a hydraulic medium via a corresponding main line into the first or the second working space. The hydraulic pump can in this case be operated forward or in reverse, whereby a comparatively fast adjustment of a damping behavior of the actively controllable shock absorber can be achieved. According to aspects of the invention, the first working space is now communicatively connected to a hydraulic reservoir via a first controllable throttle check valve, just like the second working space is communicatively connected to the hydraulic reservoir via a second controllable throttle check valve. The two throttle check valves are also communicatively connected to one another. According to aspects of the invention, the aforementioned two-way straight-through and controllable throttling device, which connects the first and the second working space, is now arranged in the piston. By means of this controllable throttling device, it is possible to achieve a comparatively fast adjustment of a damping force at low damper speeds, whereby a significantly improved adjustment of the overall damping behavior is enabled. This can in particular achieve a significantly more comfortable driving behavior. Through the arrangement of the controllable throttling device in the piston, the latter can also be arranged in a more installation space-saving and at the same time protected manner.

Expediently, the first throttle check valve and the second throttle check valve are arranged in a secondary line, wherein the first throttle check valve is oriented opposite to the second throttle check valve. Through the opposite orientation of the two throttle check valves, both compression movements and rebound movements can be dampened. Even if the hydraulic pump fails, the damping system still functions as a semi-active 2-valve damper.

In an advantageous development, the hydraulic reservoir is communicatively connected to the secondary line. For example, the hydraulic reservoir is connected between the first and second throttle check valves to the secondary line, whereby a supply of the damping system with hydraulic medium can be achieved independently of a compression or rebound process.

In a further advantageous embodiment of the damping system according to aspects of the invention, the hydraulic pump is arranged in a main line connecting the two working spaces, wherein the secondary line is connected upstream and downstream of the hydraulic pump to the main line. The secondary line with the two throttle check valves and the main line with the hydraulic pump are thus connected in parallel. This can achieved that, in normal operation, the first and second throttle check valves as well as the controllable throttling device only insignificantly intervene. Only with a desired or required adjustment of the damper force does the controllable throttling device intervene and adjusts the damping force without any problems even at low damper speeds. The main line with the hydraulic pump is in this case communicatively connected to the first working space.

In a further advantageous embodiment of the damping system according to aspects of the invention, the first throttle check valve comprises a controllable first throttle and a first check valve arranged in parallel thereto. Additionally, or alternatively, the second throttle check valve can comprise a controllable second throttle and a second check valve arranged in parallel thereto. Through the controllability of the first and/or the second throttle in the respectively associated first or second throttle check valves, a re-refined control of the damping system or an adjustment of the damper force can be achieved. Provided for this purpose is, for example, a control device that receives corresponding values for controlling the damping system, via corresponding sensors, e.g., pressure sensors and/or speed sensors.

The present invention furthermore relates to the general idea of equipping a motor vehicle with such a damping system and thereby creating an active wheel suspension, which enables a variation of the damping force without any problems even at low damper speeds.

The controllable throttling device is in this case two-way straight-through and thus, in the open state, acts in a damping force-reducing manner at low damper speeds.

In a further advantageous embodiment of the motor vehicle according to aspects of the invention, the latter is designed as an electric or hybrid vehicle. Particularly in electric vehicles, due to the inherently lower noise levels in these vehicles, other factors, such as anxious driving behavior, are noticed more strongly by a driver and are more quickly perceived as unpleasant. The damping system according to aspects of the invention can thus offer a significant enhancement in comfort, in particular in electric vehicles.

Further important features and advantages of the invention arise from the claims, from the drawing, and from the associated figure description with reference to the drawing.

It is understood that the aforementioned features and the features yet to be explained below are usable not only in the respectively specified combination but also in other combinations, or on their own, without departing from the scope of the invention as defined by the claims. The aforementioned components and the components to be mentioned below of a higher-level unit, such as a device, an apparatus, or an assembly, which are designated separately, can constitute separate components of this unit, or integral regions or sections of this unit, even if shown differently in the drawing.

Preferred exemplary embodiments of the invention are shown in the drawing and explained in further detail in the following description, wherein identical reference numbers refer to identical, similar, or functionally identical components.

BRIEF DESCRIPTION OF THE DRAWINGS

The following are shown schematically.

DETAILED DESCRIPTION OF THE INVENTION

Figure 1:
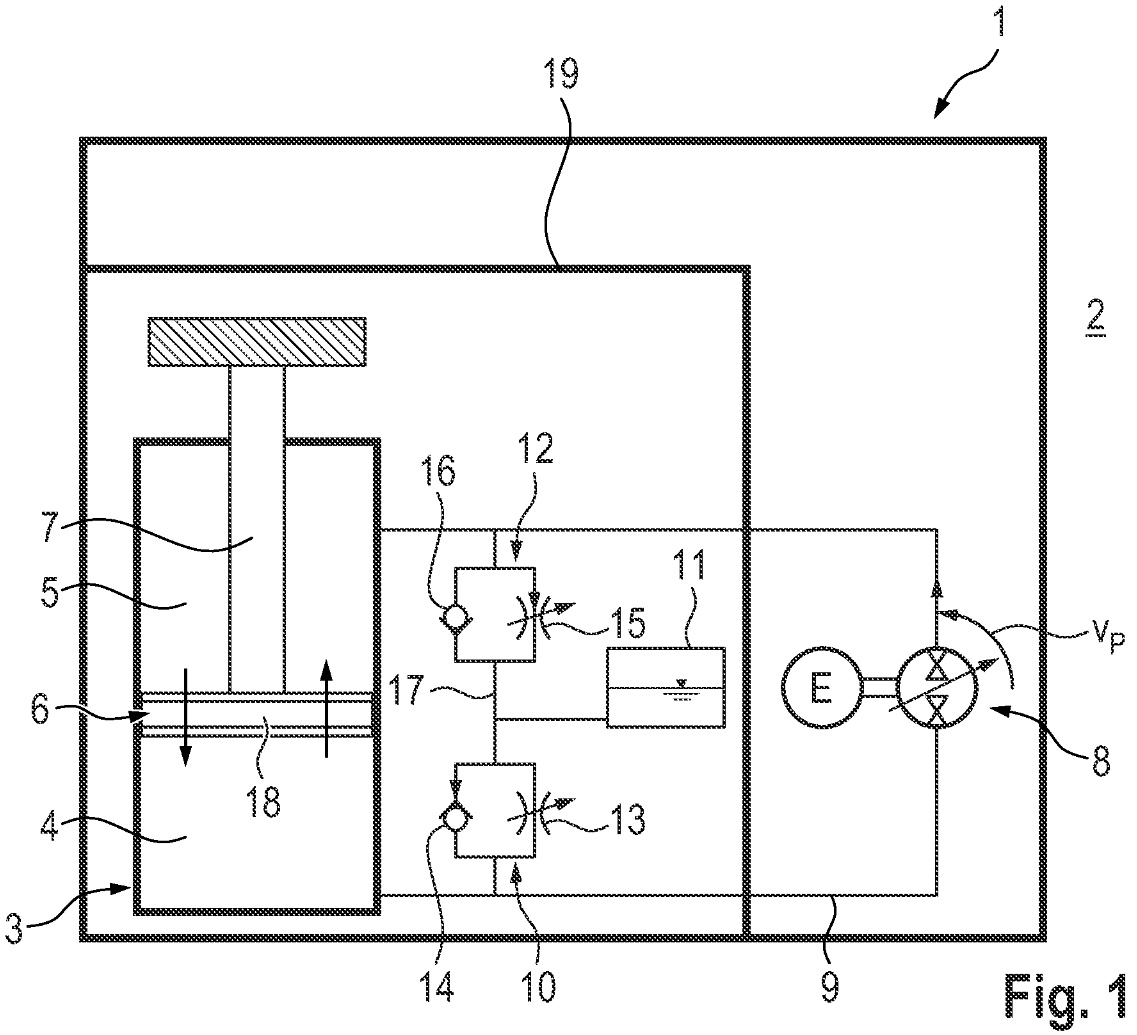
FIG. 1 is a representation of a damping system according to aspects of the invention in a motor vehicle according to aspects of the invention.

According to FIG. 1, a damping system 1 according to aspects of the invention in a motor vehicle 2, in particular in an electric or hybrid vehicle, comprises an actively controllable shock absorber 3 having a first working space 4 and a second working space 5. The two working spaces 4, 5 are separated from one another by a piston 6, wherein a piston rod 7 extends through the second working space 5. The size of the two working spaces 4, 5, of course, depends on the position of the piston 6 and is consequently variable. Furthermore provided is a hydraulic pump 8, which conveys hydraulic medium into the first working space 4 or the second working space 5, depending on the conveying direction. The hydraulic pump 8 is used for active damping force support of the shock absorber 3 and can convey the hydraulic medium in both directions. The hydraulic pump 8 is in this case integrated into a main line 9, which connects the hydraulic pump 8 to both the first working space 4 and the second working space 5.

The first working space 4 is communicatively connected to a hydraulic reservoir 11 via a first controllable throttle check valve 10, while the second working space 5 is communicatively connected to the hydraulic reservoir 11 via a second controllable throttle check valve 12. The first throttle check valve 10 comprises a controllable first throttle 13 and a first check valve 14 arranged in parallel thereto, wherein the second throttle check valve 12 additionally or alternatively comprises a controllable second throttle 15 and a second check valve 16 arranged in parallel thereto. The first throttle check valve 10 and the second throttle check valve 12 are arranged in a secondary line 17 and are arranged in parallel to the hydraulic pump 8 arranged in the main line 9. The secondary line 17 is communicatively connected upstream and downstream of the hydraulic pump 8 to the main line 9.

Figure 2:
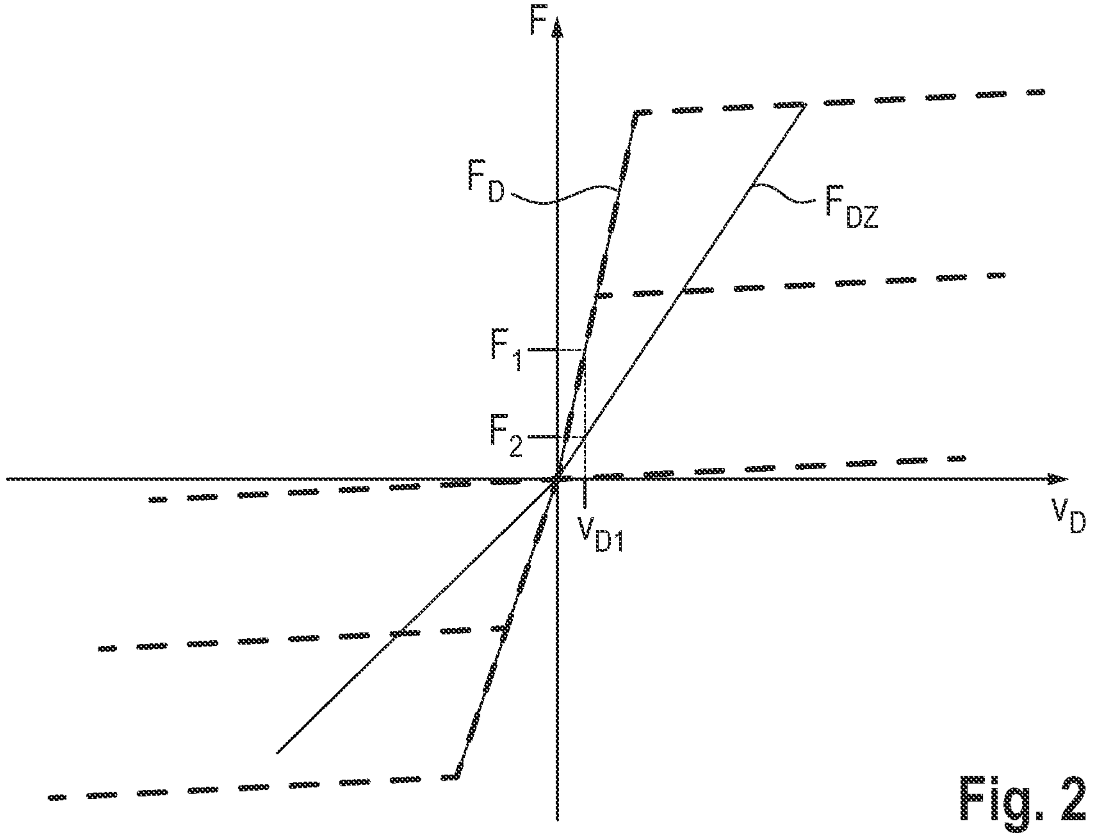
FIG. 2 is a speed-force diagram for illustrating the mode of action of the damping system according to aspects of the invention.

According to aspects of the invention, a two-way straight-through and controllable throttling device 18, which connects the first working space 4 to the second working space 5 in the open state, is now arranged in the piston 6. The two-way straight-through passage is symbolized by the two arrows. A variation of the damping force $F_D$ at small damper speeds $V_D$ can be achieved via the controllable throttling device 18, as shown in FIG. 2. Thus, if, for example, the controllable throttling device 18 is opened, the slope of the damping force straight line $F_D$ decreases from $F_D$ with the throttling device 18 not open to $F_{DZ}$ with the throttling device 18 fully open. With the throttling device 18 not open, the slope corresponds to that of a semi-active 2-valve damper 19 without hydraulic pump 8 and without throttling device 18. With the throttling device 18 open, the damping force $F_{DZ}$ also decreases at low damper speeds $V_D$, for example at a damper speed $V_{D1}$ from $F_1$ to $F_2$, wherein the following relationship applies according to the representation in FIG. 2:

$$F_2 \approx 3\,F_1.$$

Of course, depending on the design of the controllable throttling device 18, other ratios can also be represented.

All in all, with the damping system 1 according to aspects of the invention and the motor vehicle 2 according to aspects of the invention, a significantly improved variation of the damping force $F_D$ can thus be achieved even at low damper speeds $v_D$.

At low damper speeds, the non-variable damping gradient fixedly predetermined by the two control valves can thus be adjusted to the force requirement, and overdamping or underdamping in the range of small damper speeds can be prevented. This applies in particular during the change of the damper speed from the suction direction to the pressure direction.

What is claimed is:

1. A damping system for a motor vehicle, said damping system comprising:

an actively controllable shock absorber having a first working space and a second working space that are separated from one another by a piston, wherein a piston rod of the piston extends through the second working space, a hydraulic pump for conveying a hydraulic medium into either the first working space or the second working space, a first controllable throttle check valve communicatively connecting the first working space to a hydraulic reservoir, a second controllable throttle check valve communicatively connecting the second working space to the hydraulic reservoir, and a two-way straight-through and controllable throttling device arranged in the piston and which, in an open state of the throttling device, connects the first working space to the second working space, wherein the first and second controllable throttle check valves are fluidly connected together in series on a secondary line, wherein the secondary line is fluidly connected in parallel with both the hydraulic pump and the shock absorber.

2. The damping system according to claim 1, wherein the first throttle check valve is oriented opposite to the second throttle check valve on the secondary line.

3. The damping system according to claim 2, wherein the hydraulic reservoir is communicatively connected to the secondary line.

4. The damping system according to claim 3, wherein the hydraulic pump is arranged in a main line connecting the first and second working spaces, wherein the secondary line is connected to the main line at locations that are upstream and downstream of the hydraulic pump.

5. The damping system according to claim 4, wherein the hydraulic pump and the shock absorber are mounted on the main line.

6. The damping system according to claim 4, wherein the first and second controllable throttle check valves are not mounted on the main line.

7. The damping system according to claim 4, wherein the hydraulic reservoir is not mounted on the main line.

8. The damping system according to claim 4, wherein the first and second controllable throttle check valves are mounted on the secondary line.

9. The damping system according to claim 4, wherein the first and second controllable throttle check valves are mounted on the secondary line and wherein the hydraulic pump and the shock absorber are mounted on the main line.

10. The damping system according to claim 4, wherein the main line includes a first segment that interconnects one port of the hydraulic pump to the first working space and a second segment that interconnects another port of the hydraulic pump to the second working space.

11. The damping system according to claim 10, wherein the secondary line is fluidly connected to the first segment and the second segment of the main line.

12. The damping system according to claim 1, wherein (i) the first controllable throttle check valve comprises a controllable first throttle and a first check valve arranged in parallel thereto, and/or (ii) the second controllable throttle check valve comprises a controllable second throttle and a second check valve arranged in parallel thereto.

13. A motor vehicle having the damping system according to claim 1.

14. The motor vehicle according to claim 13, wherein the motor vehicle is an electric or hybrid vehicle.

15. The damping system according to claim 1, wherein the hydraulic reservoir is also fluidly connected on the secondary line at a location between the first and second controllable throttle check valves.

16. The damping system according to claim 1, wherein (i) the first controllable throttle check valve comprises a controllable first throttle and a first check valve arranged in parallel thereto, and (ii) the second controllable throttle check valve comprises a controllable second throttle and a second check valve arranged in parallel thereto.

* * * * *